Jan. 7, 1969  E. A. CARROLL  3,420,283
COMBINATION SAW
Filed June 27, 1966  Sheet 1 of 2

INVENTOR.
EVENDER A. CARROLL
BY Kimmel, Crowell & Weaver
ATTORNEYS.

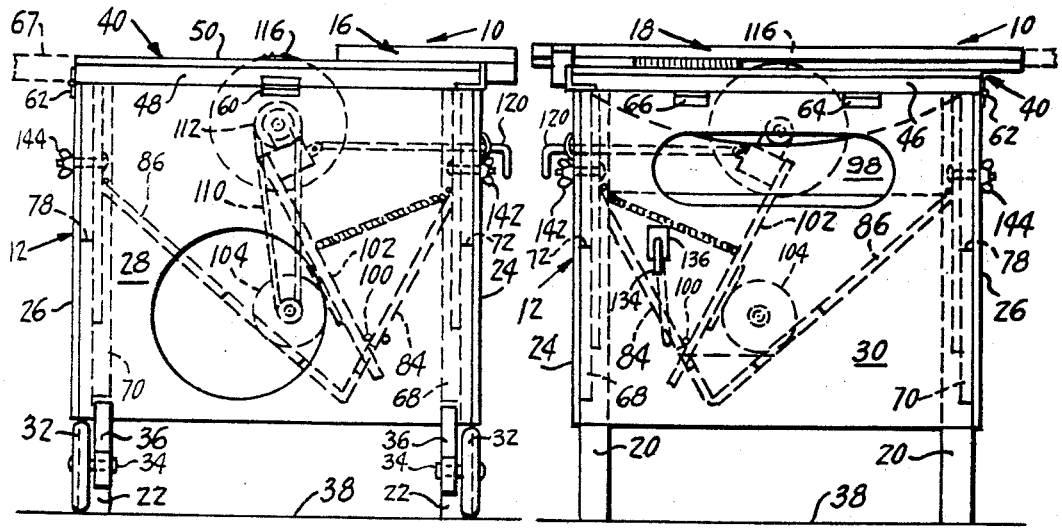
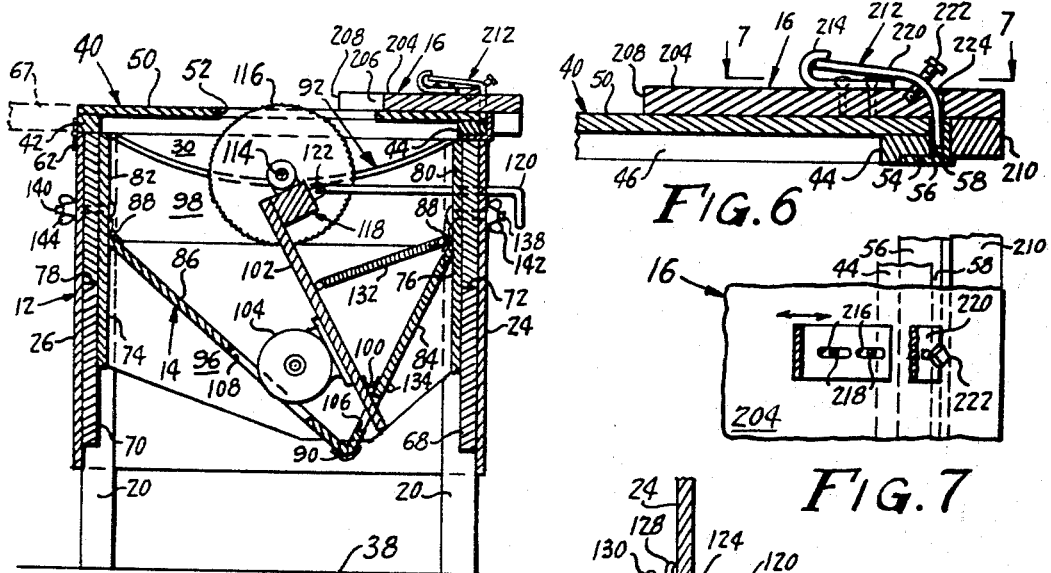
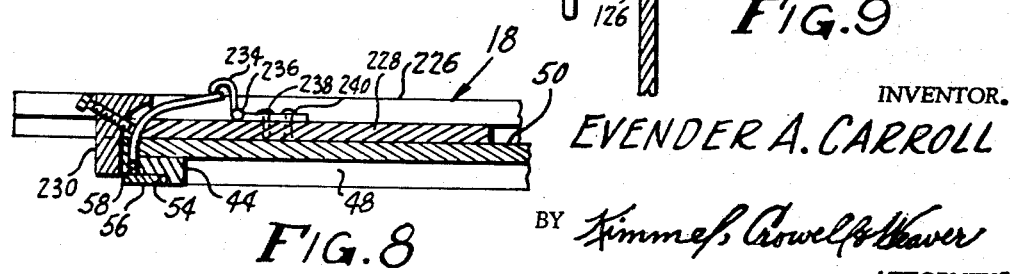

United States Patent Office 3,420,283
Patented Jan. 7, 1969

3,420,283
COMBINATION SAW
Evender A. Carroll, 1530 Mission Ave.,
Carmichael, Calif. 95608
Filed June 27, 1966, Ser. No. 560,568
U.S. Cl. 143—46                               10 Claims
Int. Cl. B27b 5/00

ABSTRACT OF THE DISCLOSURE

An undertable saw is disclosed which can move laterally through the work held stationary on the table and additionally the saw blade may be angularly adjusted to permit a double cut.

---

This invention relates to a saw which may be used for a multiplicity of purposes, and more particularly to a saw which may be used as a rip saw, a miter saw or a saw which may be used to cut a slot only partially through the work.

Undertable saws in which the saw is mounted for movement at the control of the operator are known in the prior art as exemplified by United States Patents 2,057,157, 2,505,958, and 2,792,032. In each of these devices, the saw is mounted on a pivotal arm which is connected to a controlling lever manipulated by the operator to advance the rotating blade toward the operator and through the work. This type of saw is particularly advantageous since the work may be held stationary and the saw moved therethrough, as in a conventional overhead movable saw. A disadvantage of this type saw provided by the prior art is that the blade can only cut a perpendicular groove through the work and cannot be used for angled cutting, such as may be done with a miter saw.

Another disadvantage of the prior art saws of this type lies in the fact that only a single rather crude adjustment is provided for moving the saw and positioning it above the work table. This may create some difficulty when it is desired to cut a slot partially through the work with the depth of the slot being accurately controlled.

By using the combination saw of the instant invention, the advantages of an undertable swinging saw may be selectively combined with angle cutting saws of the type shown in United States Patent 2,719,547. In addition, the device of the instant invention is provided with means for accurately adjusting the position of the saw blade after the major portion of the adjustment has been made with a lever or rod suitably arranged for such a purpose. Furthermore, the device of the instant invention is provided with an adjustable straight edge and fence so that the blade may be moved toward the work or the work moved toward the blade. It has also been found that the undertable swinging saws of the prior art often fail to provide the necessary structure or rigidity needed when moving the saw toward the work.

In brief terms, the device of the instant invention comprises a frame forming a cradle, a platform swingably mounted in the cradle, an arm pivotally mounted on the platform and carrying the saw, and suitable adjustment means connected to the platform and to the pivotal arm for selectively adjusting the position of the platform and saw.

It is an object of the instant invention to provide an undertable swinging saw that is constructed and arranged to provide an extremely stable means for angularly adjusting the saw with respect to the work.

Another object of the instant invention is to provide a new and novel connecting means securing a straight edge or a fence to the top of the saw frame thereby adding increased flexibility to the saw.

Still another object of the instant invention is to provide an additional accurate adjustment for moving the saw in the same direction as produces the movement of the saw toward the work.

A further object of the instant invention is to provide an undertable swinging saw which may be manipulated to meet the requirements of a multitude of sawing operations.

A still further object of the instant invention is to provide an undertable adjustable saw in which a cradle is provided to mount the saw-carrying platform for angular movement in order to cut a miter or the like.

Further objects and advantages of the instant invention reside in the combinations of elements, arrangements of parts, and features of construction and operation, all as will be more fully pointed out hereinafter and disclosed in the accompanying drawings wherein there is shown a preferred embodiment of this inventive concept.

In the drawings:

FIGURE 3 is an end elevational view of the adjustable saw of FIGURES 1 and 2;

FIGURE 4 is an elevational view of the other end of the adjustable saw of FIGURES 1 to 3 inclusive;

FIGURE 5 is a transverse cross-sectional view of the saw of FIGURES 1 to 4 inclusive, taken substantially along line 5—5 of FIGURE 2 as viewed in the direction indicated by the arrows;

FIGURE 6 is an enlarged transverse cross-sectional view of the adjustable saw of FIGURE 1 taken substantially along line 6—6 thereof as viewed in the direction indicated by the arrows illustrating the straight edge and means affixing the straight edge to the saw table;

FIGURE 7 is a horizontal cross-sectional view of the clamp illustrated in FIGURE 6 taken substantially along line 7—7 thereof as viewed in the direction indicated by the arrows;

FIGURE 8 is an enlarged cross-sectional view of the fence illustrated in FIGURE 1 taken substantially along line 8—8 thereof as viewed in the direction indicated by the arrows;

Figure 1:
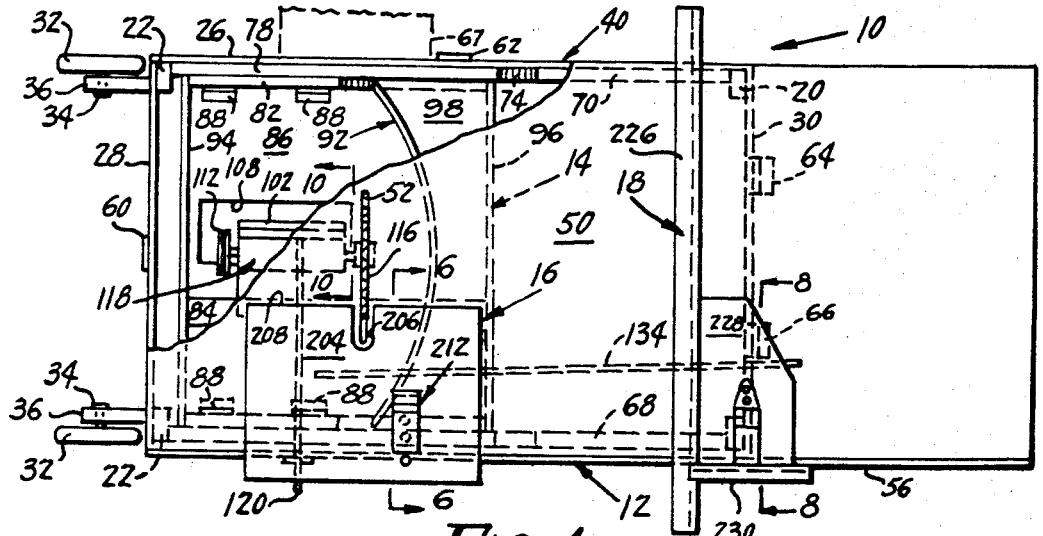
FIGURE 1 is a top plan view of the adjustable saw of the instant invention, certain parts being broken away for clarity of illustrations with a pair of table extensions being shown in dashed lines.
Figure 2:
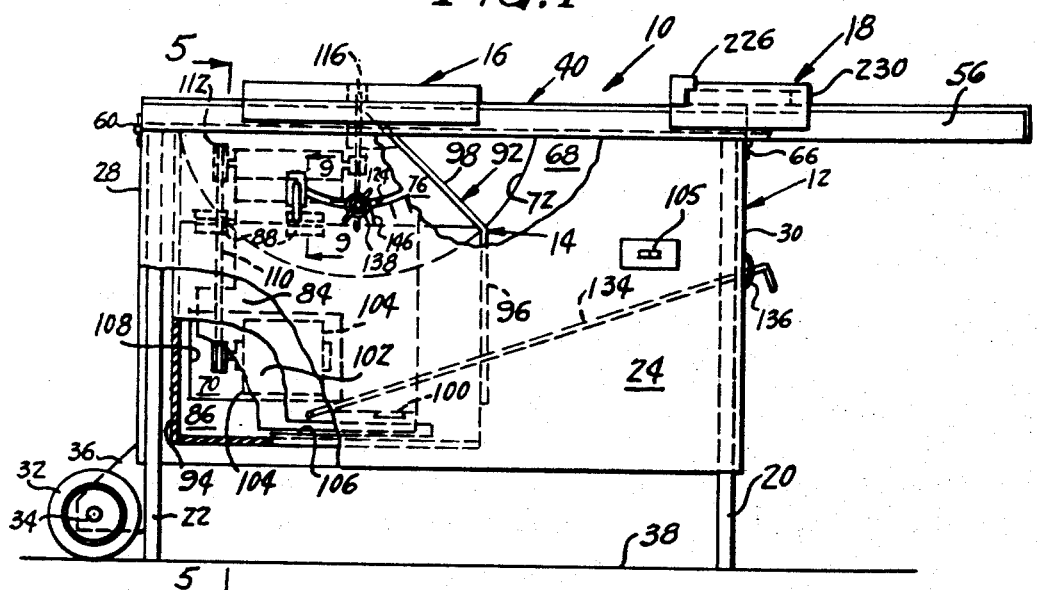
FIGURE 2 is a side elevational view of the adjustable saw of FIGURE 1, certain parts being broken away for clarity of illustrations.
Figure 10:
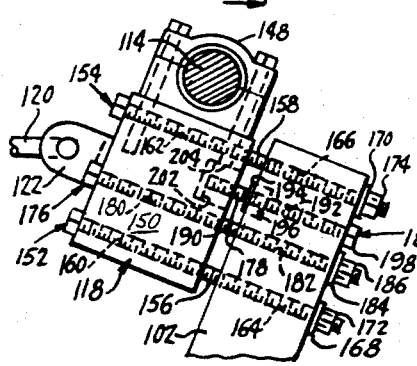

FIGURE 9 is a vertical enlarged cross-sectional view of the adjustable saw of FIGURE 2 taken substantially along line 9—9 thereof as viewed in the direction indicated by the arrows and illustrating the connection between one of the positioning rods and the side of the frame; and FIGURE 10 is an enlarged transverse cross-sectional view of the device of FIGURE 1 taken substantially along line 10—10 thereof as viewed in the direction indicated by the arrows.

General construction and operation

Referring now to the drawings in detail, wherein like reference characters designate like elements throughout the several views thereof, the adjustable saw of the instant invention is illustrated generally at 10 having as its major components a frame shown generally at 12 forming a cradle, a platform shown generally at 14 carrying a rotating saw and mounted for swinging movement in the cradle, a straight edge shown generally at 16 for guiding the work during certain operations and a fence shown generally at 18 movable along frame 12 for guiding the work in a conventional manner. As will be explained more fully hereinafter, platform 14 may be angularly adjusted about an axis transverse to the longitudinal dimension of frame 12 with the rotating saw being mounted for independent movement parallel to the access of swinging movement of platform 14. Straight edge 16 and fence 18 are both mounted for movement along one side of frame 12 in order to control the work as it engages the rotating saw.

Frame

Frame 12 includes a pair of upstanding front and rear legs 20, 22 interconnected by side walls 24, 26 and end walls 28, 30. A ground engaging wheel 32 is mounted by a stub axle 34 onto a support 36 secured to end wall 28 substantially aligned with rear legs 22 for moving frame 12 on an underlying surface 38. As shown in FIGURE 2, the lowermost portion of wheel 32 is aligned with the bottom of leg 22 thereby providing a non-movable support for frame 12 until the right-hand side of frame 12 is raised in order to move saw 10 in much the same manner that a wheelbarrow is moved.

Frame 12 includes a table top shown generally at 40 comprised of a peripheral framework including longitudinal beams 42, 44 and transverse beams 46, 48. The uppermost portion of table top 40 is a slab 50 constituting the working surface of adjustable saw 10 and forms a slot 52 for exposing the rotatable saw to the work in a conventional manner. As shown best in FIGURES 6 to 8 inclusive, longitudinal beam 44 is cut away to form a groove 54 in which an angle iron member 56 is placed with the upright leg of angle iron member 56 being spaced from the side of longitudinal beam 44 to form a groove 58 for receiving a portion of the means temporarily securing straight edge 16 and fence 18 to table top 40 as will be pointed out more fully hereinafter.

Securing table top 40 to frame 12 is a plurality of hinges 60, 62 64, 66 as shown in FIGURES 1 to 5 inclusive. As shown best in FIGURES 1 and 3, hinge 60 secures one end of table top 40 flush with end wall 28 of frame 12 while hinge 62 secures table top 40 flush with side wall 26. Since hinges 60, 62 have a readily removable pin securing the two parts thereof together, it will be seen that this connection may readily be severed at the option of the operator. Hinges 64, 66 secure an intermediate portion of table top 40 to end wall 30. When the operator desires access to the interior of frame 12, the pins securing hinges 60, 62 in place are removed, fence 18 is slidably moved to the end of table top 40 and the table top is pivoted about the axis of hinges 64, 66. Because fence 18 will tend to counterbalance the remainder of table top 14, the operator may raise table top 40 to a desired position where it is substantially stable.

As shown in FIGURES 1, and 3 and 5 an extension 67 may be removably secured to side wall 26 of frame 18 to provide additional support for a workpiece being advanced toward the saw blade. Although extension 67 may be secured to side wall 26 in any convenient manner, it is preferred that another hinge (not shown) be provided thereon with extension 67 carrying a depending leg engaging ground surface 38.

Supporting platform 14 interiorly of frame 12 is a pair of cradle forming walls 68, 70 permanently affixed to the inner surface of side walls 24, 26. Each of walls 68, 70 forms a cutout 72, 74 shaped as a circular arc having a center of rotation positioned substantially at the top of slab 50.

Platform

Swingable platform 14 includes a pair of depending legs 76, 78, the lowermost end of which forms a circular arc concentric with cutout 72, 74 with legs 76, 78 being received by cutouts 72, 74 in load supporting relation. As shown best in FIGURE 2, the arc formed by legs 76, 78 is substantially less than the arc of cutouts 72, 74 to allow swinging movement of platform 14 through an angle of about 45°. Platform 14 also includes a central supporting structure secured between legs 74, 76 comprised of a pair of substantially vertical walls 80, 82 respectively secured to legs 76, 80. A pair of diagonal walls 84, 86 are secured intermediate the end of walls 80, 82 by suitable angled brackets 88 with a bracket 90 fastening walls 84, 86 together in predetermined angular relation. As shown in FIGURE 5, walls 80, 82 extend below the lowermost portion of legs 76, 78 and reside adjacent walls 68, 70, thereby steadying platform 14 during its swinging movement on frame 12.

Further steadying and rigidifying platform 14 is a pair of end walls 92, 94. As shown best in comparison of FIGURES 1, 2 and 5, end wall 92 is comprised of two segments, a first vertical segment 96 secured to diagonal walls 84, 86 and to the lowermost portion of vertical walls 80, 82. An upper segment 98 of end wall 92 is secured between walls 80, 82 adjacent the angled face legs 76, 78 as shown in FIGURE 2. As seen most clearly in FIGURES 1, 4 and 5, the uppermost edge of segment 98 is outwardly concave to avoid interference between segment 98 and table top 40.

Pivotally mounted on diagonal wall 84 by a hinge 100 is an arm 102 carrying an electric motor 104 controlled through a conventional switch 105 projecting through wall 24. As shown best in FIGURE 5, an opening 106 is formed in diagonal wall 88 to accommodate movement of the end of arm 102. A similar opening 108 is cut into diagonal wall 86 to accommodate the movement of motor 104 therethrough. An endless belt 110 interconnects motor 104 and a pulley 112 fixed on a shaft 114 carrying a rotatable blade 116. Shaft 114 is mounted for rotation on a mounting block shown generally at 118 carried by pivoted arm 102 in a manner to be discussed more fully hereinafter. An L-shaped rod 120 is pivotally mounted to an ear 122 on mounting block 118 and extends through aligned apertures in wall 80 and leg 76 and through a slot 124 in side wall 24 of frame 12.

As shown best in FIGURE 9, suitable means are provided to affix rod 120 at any suitable location in order to position blade 116 at an appropriate position. An arcuate groove 126 is provided under slot 124 with spring keeper 128 surrounding rod 120 and extending into groove 126. A cotter key or other suitable shoulder 130 is provided on rod 120 to prevent the loss of keeper 128. It will be evident that the operator may pull out on rod 120, release keeper 128 and then adjust the angular position of pivotal arm 102 thereby positioning saw blade 116 at any desired point. It should be noted that pivoted arm 102 is normally inclined away from the vertical with a spring 132 interconnecting arm 102 and diagonal wall 84 biasing arm 102 toward the vertical. When the individual adjusts the position of saw 116 by manipulating rod 120, the moving of the saw away from the individual is not greatly exertive since the arm and attached structure is moving toward the horizontal. Moving the entire weight of arm 102 toward the individual would be a much greater task without the provision of spring 132 acting to counterbalance the weight of arm 102.

A second L-shaped rod 134 is pivotally secured to platform 14 and extends longitudinally of frame 12 to exit through a suitable aperture in end wall 30. A keeper 136 is mounted about the end of rod 134 in much the same manner as shown in FIGURE 9. When an individual desires to swing platform 14 and thereby position saw blade 116 at an angle, keeper 136 may be released with rod 134 being pulled until saw blade 116 is at the desired angle, at which time keeper 136 is again positioned adjacent wall 30 for holding rod 134 in place. It should be noted that legs 76, 78 may be swung in cutouts 72, 74 through an angle shown approximately by the divergence of diagonal segment 98 and table top 40.

Facilitating the secure positioning of platform 14 with respect to frame 12 is a bolt 138, 140 extending respectively through wall 78, leg 76 and wall 82, leg 78 through slots 124 to the exterior of frame 12. It will be apparent that wing nuts 142, 144 are loosened prior to the manipulation of rod 134 followed by the tightening of nuts 142, 144 thereby firmly securing swingable platform 14 in any desired position. As shown best in FIGURE 2, suitable indicia 146 are provided adjacent slot 124 facilitating the accurate placement of platform 14. It should be understood that a suitable mark may be placed on legs 76, 78 to indicate the position of platform 14. Alternatively, bolts 138, 140 may act as a guide to cooperate with indicia 146.

Referring now to FIGURE 10, mounting block 118 includes a bearing 148 rotatably receiving shaft 114 and secured by suitable bolts (not shown) to a movable mounting block 150 which is in turn fastened to arm 102 by the plurality of fasteners shown in FIGURE 10. First and second fasteners shown generally at 152, 154 include a threaded shank 156, 158 closely received by non-threaded apertures 160, 162 in mounting block 150 and by aligned unthreaded openings 164, 166 in arm 102. Washers 168, 170 and nuts 172, 174 are secured on the end of shanks 156, 158 thereby firmly securing fasteners 152 154 in the position illustrated. As will be explained more fully hereinafter, neither of fasteners 152, 154 is altered during the adjustment of mounting block 150 with respect to pivoted arm 102.

A third fastener shown generally at 176 is faced centrally of block 150 and on the other end thereof away from fasteners 152, 154. Fastener 176 includes a threaded shank 178 extending through aligned non-threaded openings 180, 182, respectively in block 150 and arm 102. A washer 184 and nut 186 are on the end of shank 178 for advancing block 150 toward arm 102.

A spacer shown generally at 188 is illustrated in FIGURE 10 as positioned vertically from threaded fastener 176 and includes a threaded shank 190 extending through an unthreaded opening 192 in arm 102. A nut 194 resides in a cutout 196 formed in arm 102 away from the head 198 of spacer 188 providing for the advancement of shank 190 upon rotation of head 198. The end of shank 190 rests in a blind aperture 200 in block 150 aligned with opening 192. A hardened plate 202 is preferably fitted within blind opening 200 to abut the movable end of shank 190 thereby avoiding the destruction of block 150 by contact with shank 190. Although spacer 188 is shown as vertically spaced from third fastener 176 for clarity of illustration, it is preferred that spacer 188 be horizontally aligned with fastener 176 and laterally spaced therefrom.

It will be apparent that nut 186 of third fastener 176 is loosened followed by the threading or unthreading of spacer 188 to vary the position of block 150 with respect to arm 102. When spacer 188 is advanced toward block 150, the terminal end of shank 190 contacts plate 202 thereby pushing block 150 away from arm 102. Since shanks 156, 158 are perpendicular to arm 102 and act as guides, block 150 is thereby mounted for movement perpendicular to arm 102. When it is desired to space block 150 closer to arm 102, spacer 188 is threadably retracted followed by the tightening of nut 186 until block 150 is firmly bound in position.

It will therefore be apparent that mounting block 118 provides an extremely accurate adjustment for the positioning of saw blade 116 after rod 120 is held in place. In addition, manipulation of rod 134 controls the angular position of blade 116 about an axis transverse to the longitudinal dimension of frame 12 while the manipulation of rod 120 controls the extent that blade 116 extends above table top 40. Furthermore, rod 120 can manipulate saw blade 116 to advance it through the work.

Straight edge 16 includes a block of material 204 forming a slot 206 aligned with blade 116 as shown best in FIGURE 1. After straight edge 116 is positioned with slot 206 aligned with blade 116, a workpiece is placed against face 208 with rod 120 being pulled by the operator to sever a predetermined segment from the workpiece. As shown best in FIGURES 6 and 7, straight edge 16 also includes a depending abutment 210 residing against the exterior vertical face of angle iron member 56.

Affixing straight edge 16 to table top 40 at any point along the extent of groove 58 is a connecting means shown generally at 212 comprised of a J-shaped metal bracket 214 forming a pair of slots 216 receiving screws 218 or the like therethrough. Because of the elongated nature of slots 216, it will be readily apparent that bracket 214 is adjustable in the direction shown by the arrow in FIGURE 7. The other half of connecting means 212 is a resilient arcuate strap 220 secured by a fastener 222 to block 204 with the lowermost end of strap 220 extending through an opening 224 into groove 58. The connection between strap 220 and fastener 222 is such as to allow rocking movement of strap 220.

In order to release straight edge 16 from connection with table top 40, the operator slides bracket 214 away from strap 220 such that the upper end of strap 220 is freed from engagement under the short leg of bracket 214. Since strap 220 is in compression in the secured position shown in FIGURE 6, the upper end of strap 220 will move upwardly thereby freeing the lower end of strap 220 from frictional binding engagement with the inner vertical wall of angle iron member 56. It will be seen, therefore, that the separation of bracket 214 and strap 220 allows sliding movement of straight edge 16 along the edge of table top 40. When it is desired to secure straight edge 16 in position, it is necessary only to depress the upper end of strap 220 and slide bracket 214 into overlying engagement with strap 220.

As shown best in FIGURES 1, 2 and 8, fence 18 includes a bar 226 extending transverse to the longitudinal dimension of frame 12 and carries a plate 228 overlying table top 40 adjacent angle iron member 56. Fence 18 also includes a block-like extension 230 perpendicular to bar 226 and extending away from straight edge 18 parallel to angle iron member 56. As shown in FIGURE 8, a connecting means shown generally at 232 acts to secure fence 18 at any desired point along the lateral edge of table top 40.

Connecting means 232 is quite similar to connecting means 212 and includes a hook 234 pivotally mounted by a hinge 236 to a plate 238 which is in turn connected by fasteners 240 to plate 228 of fence 18. Since hook 234 is movable toward and away from extension 230, it will be seen that it is roughly comparable to J-shaped bracket 214 of connecting means 212. The other portion of connecting means 232 is an arcuate strap of resilient material 242 extending through a passageway 244 in extension 230 to reside in groove 58. A fastener 246 passes through extension 230, passageway 244 and plate 228 thereby mounting strap 242 for rocking movement.

When it is desired to release fence 18 from the position shown in FIGURE 8, strap 242 may be depressed slightly followed by the rotation of hook 232 in a clockwise direction. The release of strap 242 relaxes the forces biasing the lower end of strap 242 against the inner vertical wall of angle iron member 56. After fence 18 has been slidably moved along the track formed by angle iron member 56 to the desired location, the forward end of strap 242 may be depressed followed by the counterclockwise rotation of hook 234 into engagement therewith for frictionally binding the lower end of strap 242 in groove 58.

It is now seen that there is herein provided an improved combination saw which accomplishes all of the objects and advantages of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:

1. An undertable adjustable saw for making angled cuts comprising a frame including a working surface and a cradle there-under having a pair of spaced apart aligned upwardly facing concave surfaces forming a portion of a circular arc;

a swingable platform having a pair of legs providing downwardly facing convex surfaces forming a portion of a circular arc less than the arc of the cradle surfaces and concentric therewith, the legs being in load supporting relation with the cradle for swinging the platform on the frame;

means, attached to the platform, for selectively swinging the platform about the axis of the cradle;

an arm mounted on the platform for pivotal movement about an axis transverse to the axis of the cradle;

a rotary saw on the arm for movement therewith;

means, attached to the arm, for selectively swinging the arm about its axis of movement.

2. The adjustable saw of claim 1 wherein the arm is normally in a nonvertical attitude and wherein the arm swinging means includes a rod, pivotally connected with the arm; extending through an opening in one side of the frame;

a keeper, on the rod abutting the frame, holding the rod in a selected position; and means, interconnecting the arm and the platform, biasing the arm toward the vertical position.

3. The adjustable saw of claim 2 wherein the frame opening comprises an arcuate slot forming a portion of a circular arc concentric with the arcs of the cradle and legs and further including a pin, on the platform, extending through the slot and a keeper, on the pin abutting the frame, holding the platform in a selected position.

4. The adjustable saw of claim 1 further including means interconnecting the saw and the pivotal arm for accurately adjusting the position of the saw perpendicular to the arm in the direction of pivotal movement of the arm.

5. The adjustable saw of claim 4 wherein the adjusting means includes a mounting block carrying the saw and means securing the block to the arm for selective movement toward and away from the arm in a plane perpendicular thereto.

6. The adjustable saw of claim 5 wherein the securing means includes at least one guide constraining the block to perpendicular movement, means for advancing the block and the arm toward each other and means for separating the block and arm, the advancing and separating means being opposed for binding the block in a predetermined position.

7. An undertable swinging saw comprising:

a frame including a working surface;

an arm carried by the frame under the working surface for pivotal movement toward one side of the frame;

a rotary saw;

means mounting the rotary saw on the arm for adjusting the saw with respect to the arm;

means, attached to the arm, for selectively pivoting the arm;

said mounting means including a mounting block carrying the saw;

means securing the block to the arm for selective movement toward and away from the arm in a plane perpendicular thereto;

said securing means including at least one guide constraining the block to perpendicular movement, means for advancing the block and the arm toward each other and means for separating the block and arm, the advancing and separating means being opposed for binding the block in a predetermined position.

8. The adjustable saw of claim 7 wherein the means for separating the block and arm includes a threaded shank mounted between the block and arm for threadable advancement.

9. The adjustable saw of claim 8 wherein the terminal end of the threaded shank is received in a blind opening, and further including a hardened plate in the blind opening.

10. The adjustable saw of claim 8 wherein the advancing means includes a threaded bolt extending through the block and the arm and a nut received on the end thereof.

References Cited
UNITED STATES PATENTS

| | | | |
|---|---|---|---|
| 2,792,032 | 5/1957 | Olsen | 143—46 |
| 2,937,672 | 5/1960 | Gjerde | 143—36 X |
| 2,973,789 | 3/1961 | Palmer | 143—36 |
| 3,011,533 | 12/1961 | Newman | 143—36 X |
| 3,344,819 | 10/1967 | Mitchell | 143—36 |

FRANCIS S. HUSAR, *Primary Examiner.*

U.S. Cl. X.R.

143—36, 6